United States Patent [19]
Kresak

[11] Patent Number: 5,297,950
[45] Date of Patent: Mar. 29, 1994

[54] STRIPPING STATION
[75] Inventor: Paul F. Kresak, Newmarket, Canada
[73] Assignee: Husky Injection Molding Systems Ltd., Bolton, Canada
[21] Appl. No.: 949,588
[22] Filed: Sep. 23, 1992
[51] Int. Cl.$^5$ .............................................. B29C 33/44
[52] U.S. Cl. ................................ 425/436 R; 414/288; 425/534; 425/537
[58] Field of Search ................... 425/537, 534, 436 R, 425/437, 422; 414/331, 288

[56] References Cited
U.S. PATENT DOCUMENTS

| | | | |
|---|---|---|---|
| 3,836,300 | 9/1974 | Farrell | 425/537 X |
| 3,918,866 | 11/1975 | Eichenberger et al. | 425/537 X |
| 4,522,581 | 6/1985 | Schad et al. | 425/534 |
| 4,767,311 | 8/1988 | Gibbemeyer | 425/534 X |
| 4,793,960 | 12/1988 | Schad et al. | 264/535 |
| 4,854,848 | 8/1989 | Krall et al. | 425/537 X |

Primary Examiner—Richard L. Chiesa
Attorney, Agent, or Firm—Bachman & LaPointe

[57] ABSTRACT

A stripping station for stripping hollow plastic articles from a holding means is disclosed and includes a nest for receiving neck portions of the articles, and a cutout bar for admitting, trapping and ejecting the articles in the nest, the cutout bar being slidably mounted to the nest and being displaceable between an admitting position, wherein the articles can be admitted into the nest, a trapping position wherein the articles are trapped in the nest for transport, and an ejecting position wherein the articles are ejected from the nest.

14 Claims, 4 Drawing Sheets

STRIPPING STATION

BACKGROUND OF THE INVENTION

1. Field of the Invention

The invention relates to the field of injection or compression molding (collectively referred to as pressure molding) of workpieces such as hollow plastic articles and formation of hollow blow molded articles therefrom and, more particularly, to a stripping station for stripping finished articles from pallets and transferring the finished articles to a discharge station.

2. Description of the Related Art

A system for preparing and conveying pressure molded plastic articles, or workpieces, is disclosed in U.S. Pat. No. 4,793,960 to Schad et al and assigned to the assignee of the present invention. The '960 patent discloses a process wherein parisons are carried on pallets between various treatment stations. Pallets on which these parisons are transported are recycled in a continuous manner by conveying the pallets on a continuous belt wherein parisons are disposed on the pallets, transferred to a subsequent station for the formation of blow molded hollow articles, and the hollow articles are removed or stripped from the pallets, at which point the pallets return on the continuous belt to receive a new batch of parisons.

The present invention is drawn to the method by which workpieces or parisons, or preferably the blow molded hollow articles, are stripped from the pallets.

According to the prior art, articles are stripped from the pallets through suction or vacuum. Such a procedure is also disclosed in U.S. Pat. No. 4,522,581 to Schad et al, also assigned to the assignee of the present invention. Methods involving the application of suction or a vacuum, however, prove difficult to carry out and require expensive locating means to place articles into guide tubes through which suction or vacuum is applied.

Attempts have been made to improve upon this stripping method by mechanically grasping workpieces with a pair of arms and stripping the workpieces from the pallets. Such attempts are generally unsuccessful, however, because the workpieces tend to stick to one of the arms, thus preventing the discharge of workpieces from the arms.

The principal object of the present invention is, therefore, to provide a stripping station for hollow blow molded articles wherein the articles can be stripped from a holding means, such as pallets, without sticking.

It is a further object of the present invention to provide a stripping station which is simple, reliable and efficient in operation.

Other objects and advantages Will become apparent to one skilled in the art upon a consideration of the following disclosure.

SUMMARY OF THE INVENTION

The foregoing objects and advantages are readily attained by a stripping station for removing hollow plastic articles from holding means, such as pallets, which comprises, according to the invention, nest means for receiving neck portions of said articles; and means for admitting, trapping and ejecting said articles in said nest means, said means for admitting, trapping and ejecting being slidably mounted relative to said nest means and being displaceable between an admitting position, wherein said articles can be admitted into said nest means, a trapping position wherein said articles are trapped in said nest means for transport, and an ejecting position wherein said articles are ejected from said nest means.

Further according to the invention, said nest means preferably comprises a beam having a plurality of nests, sized to receive neck portions of said articles, said nests being at least equal in number to a number of articles to be removed from the holding means, and being spaced so as to correspond to spacing of said articles on the holding means.

Still further according to the invention, said admitting, trapping and ejecting means preferably comprises a bar slidably mounted relative to said beam, said bar having a plurality of cutouts corresponding to said nests in said nest means, said cutouts of said bar each having a trapping ridge and an ejecting cam, arranged so that, when said bar is in said trapping position, said trapping ridge engages with a corresponding article, and when said bar is in said ejecting position, said ejecting cam pushes a corresponding article out of said nest of said nest means.

According to a still further preferred embodiment of the invention, said beam and said bar are mounted on an arm pivotally attached to a frame, said arm being pivotable between a receiving position, wherein said nests face a pallet containing articles to be stripped, and a discharge position, wherein said articles are discharged into a discharge station.

According to the invention, articles to be stripped are preferably hollow blow molded articles.

BRIEF DESCRIPTION OF THE DRAWINGS

A detailed description of the preferred embodiments of the invention follows, with reference to the attached drawings, wherein.

DETAILED DESCRIPTION OF THE PREFERRED EMBODIMENTS

The invention relates to the field of injection or compression molding, (collectively referred to as pressure molding), of hollow plastic articles or parisons and especially to the formation of blow molded articles therefrom. A typical system transfers parisons between treatment stations on pallets which are recirculated through the system to form the blow molded articles, although naturally any holding means is contemplated. A new batch of parisons is placed on the pallet after a completed batch is removed, or stripped, from the pallet. The present invention is specifically drawn to a stripping station for removing finished hollow blow molded articles from holding means, although the present invention may also readily apply to stripping of the parisons themselves if desired. For convenience, in the following discussion, the invention will be described in connection with pallets.

Figure 1:
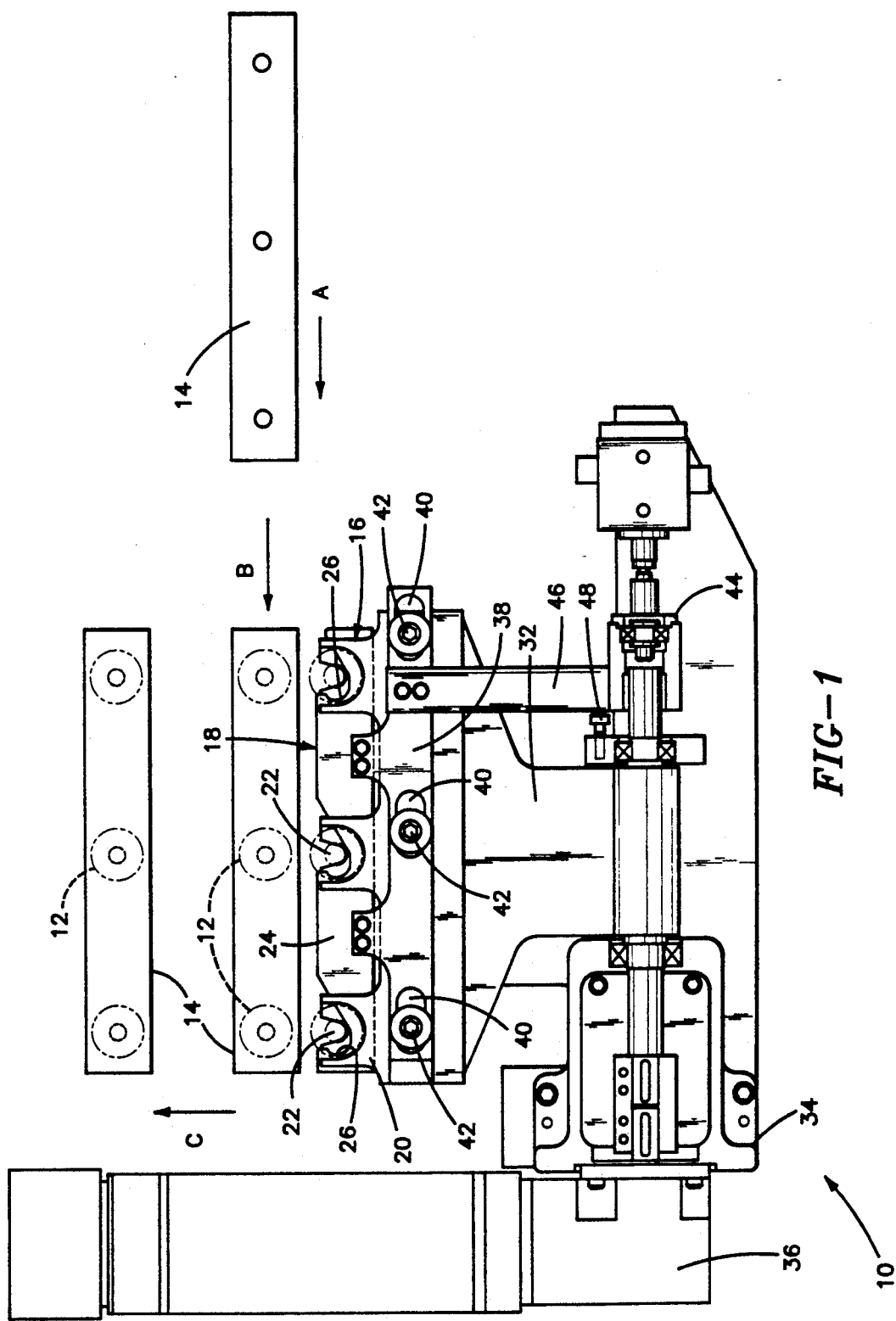
FIG. 1 is a top view of a stripping station in a position for admitting articles to be stripped from a pallet, according to the invention.

FIG. 1 shows a top view of a stripping station 10 according to the invention.

Stripping station 10 is preferably situated at the end of a series of continuous treatment stations (not shown) for processing hollow blow molded articles from parisons. Articles 12 are carried from a pressure molding machine or from a storage source on pallets 14 to the blow molding station and thence toward stripping station 10, as shown by arrow A. Pallets 14 are aligned with stripping station 10 as shown by arrow B. After articles 12 are stripped from pallets 14, pallets 14 are recirculated back to the various stations of the pressure molding machine as shown by arrow C, to receive a new batch of parisons for treatment.

Stripping station 10, according to the invention, comprises a nest means 16 for receiving articles 12 from pallets 14, and means 18 for admitting, trapping and ejecting articles 12 in nest means 16.

Figure 2:
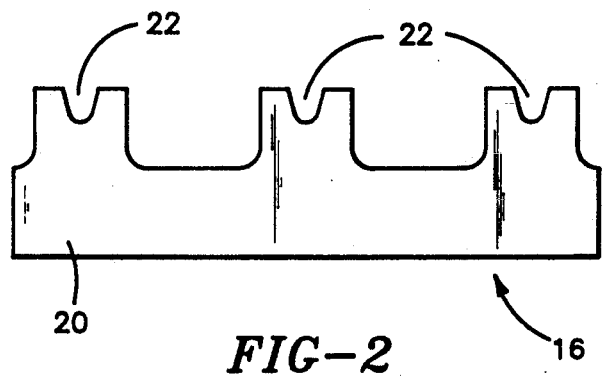
FIG. 2 is a top view of a preferred embodiment of a nested beam of the stripping station according to the invention.

FIG. 2 shows a preferred embodiment of nest means 16. Nest means 16 preferably includes a beam 20 having a plurality of nests 22 disposed therein. As many nests 22 may preferably be formed in beam 20 as are necessary to accommodate the expected number of articles to be carried by each pallet 14. Preferably, beam 20 is provided with nests 22 at least equal in number to a number of articles 12 to be removed from each pallet 14. Nests 22 are preferably spaced so as to correspond to a spacing of articles 12 on pallets 14. Nests 22 are shaped so as to slidably receive a portion of articles 12 to be stripped. A typical article 12 will be a plastic bottle (as shown for example in FIG. 5) having a neck portion, although of course the workpiece may be the parison or preform, if desired. For this typically shaped article 12, nests 22 are preferably sized to receive the neck portion of articles 12.

Figure 3:
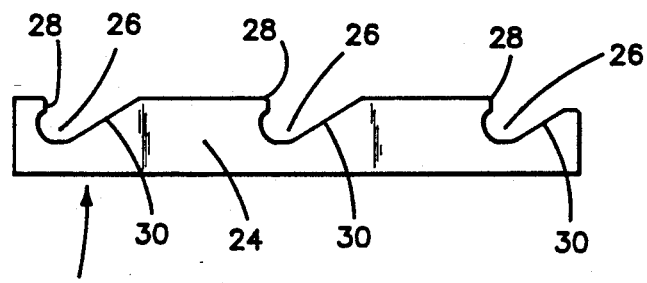
FIG. 3 is a top view of a preferred embodiment of a cutout bar of the stripping station according to the invention.

FIG. 3 illustrates a preferred embodiment of admitting, trapping and ejecting means 18 according to the invention.

Admitting, trapping and ejecting means 18 preferably includes a bar 24 having a plurality of cutouts 26. Cutouts 26 are preferably provided in like number to nests 22 of nest means 16. Each cutout 26 is preferably formed, according to the invention, so as to have a trapping ridge 28 and an ejecting cam 30. Cutouts 26 are preferably all of the same contour so as to provide synchronous stripping of articles as discussed below.

Figure 4A:
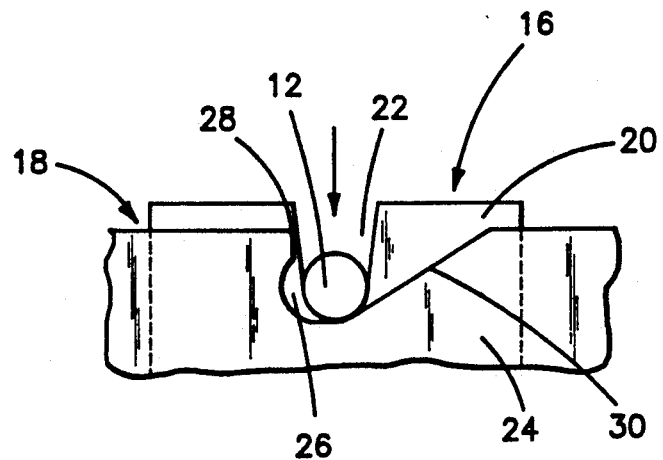
FIGS. 4A, 4B and 4C show the admitting, trapping and ejecting positions of the cutout bar relative to nested beam of FIGS. 2 and 3, according to the invention.
Figure 4B:
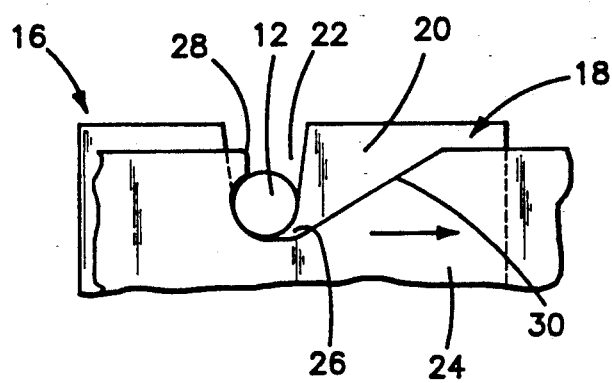
Figure 4C:
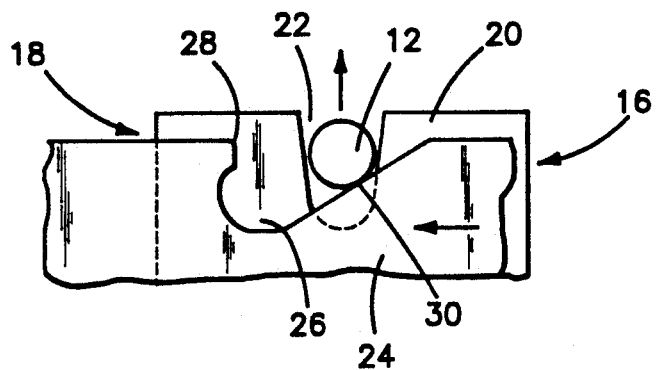

FIGS. 4A, 4B and 4C illustrate a portion of nested beam 20 and cutout bar 24 superimposed. Bar 24 is preferably slidably mounted relative to beam 20 so as to allow displacement of bar 24, relative to beam 20, into each of the three positions shown.

FIG. 4A illustrates an admitting position, wherein cutout 26 is aligned with nest 22 so that neither trapping ridge 28 nor ejecting cam 30 interferes with free passage of article 12 into nest 22 as shown. In this admitting position, nest means 16 is preferably positioned so as to receive at least one, preferably a plurality of articles 12 from an incoming loaded pallet 14 in the manner shown in FIG. 1.

FIG. 4B illustrates a trapping position of cutout bar 24 relative to beam 20. In this position, bar 24 is laterally displaced to the right relative to beam 20, as shown in FIG. 4B. In the trapping position, trapping ridge 28 of cutout 26 extends into an open end of cutout 22 and grasps article 12 so as to hold article 12 firmly in nest 22. With article 12 firmly grasped in nest 22, article 12 can be stripped from pallet 14, pallet 14 moved away, and the article transported as desired.

FIG. 4C illustrates an ejecting position of cutout bar 24 relative to beam 20. In this position, bar 24 is laterally displaced to the left relative to beam 20, as shown in FIG. 4C. In this position, trapping ridge 28 is withdrawn from nest 22, thus releasing the grasp on article 12, and ejecting cam 30 enters nest 22 and pushes article 12 out of nest 22. In this way, and advantageously, article 12 can be ejected from nest 22 without sticking to portions of the apparatus.

Referring back to FIG. 1, beam 20 and cutout bar 24 may preferably be mounted to an arm 32. To facilitate stripping of articles 12 from pallets 14, arm 32 is preferably pivotally mounted to a housing 34. Pivot of arm 32 serves to lift beam 20 and bar 24 up from pallet 14, thereby stripping trapped articles 12 from pallet 14. This pivot may preferably be provided by any motive means known in the art, schematically shown in FIG. 1 as motive means 36.

Still referring to FIG. 1, lateral displacement of bar 24 relative to beam 20 may preferably be accomplished as follows. Beam 20 is preferably fixedly mounted to arm 32, with bar 24 slidably mounted to beam 20. This slidable mounting may preferably be provided by mounting bar 24 to a plate 38. Plate 38 has a plurality of grooves 40 disposed laterally thereon. Fasteners 42 are preferably mounted to beam 20, or arm 32, and disposed through grooves 40. In this manner, plate 38 with attached bar 24 can be laterally displaced relative to beam 20 to the extent of grooves 40 which define at one extent the trapping position of FIG. 4B, and at the other extent, the ejecting position of FIG. 4C.

Lateral displacement of plate 38 relative to beam 20 may be provided by any motive means known in the art. Preferably, such displacement may be provided through an air cylinder 44 physically connected to plate 38 through rod 46. In this configuration, plate 38 can be displaced laterally through the application of pressure or vacuum to air cylinder 44. Air cylinder 44 may preferably be arranged concentric with an axis of rotation of arm 32 so that air cylinder 44 can pivot with arm 32, thus facilitating the operation thereof.

It should be noted that the preferred configuration wherein bar 24 is displaced and beam 20 is fixed is preferable because nests 22 of beam 20 remain in the same place, laterally, thus simplifying alignment of nests 22 with articles 12 of incoming pallets 14. Obviously, however, the teachings of the present invention could be employed to move beam 20 relative to cutout bar 24, as long as steps were taken to ensure proper alignment of nests 22 with articles 12.

Stop means 48 may preferably be disposed on housing 34 so as to assist in providing proper positioning of plate 38 and bar 24 relative to beam 20. When arm 32, beam 20 and cutout bar 24 are aligned to receive a set of articles 12, as shown in FIG. 1, lateral displacement of bar 24 is desirable only between the admitting position of FIG. 4A and the trapping position of FIG. 4B. Thus, stop means 48 is preferably oriented so as to act upon rod 46, or some other structure connected to bar 24, so as to limit leftward displacement of bar 24 to the extent required by the admitting position. When arm 32 is pivoted to carry articles 12 to the ejecting or discharge position, rod 46 is pivoted out of interaction with stop means 48 so that air cylinder 44 can laterally displace bar 24, relative to beam 20, between the trapping position of FIG. 4B and the ejecting position of FIG. 4C.

Figure 5:
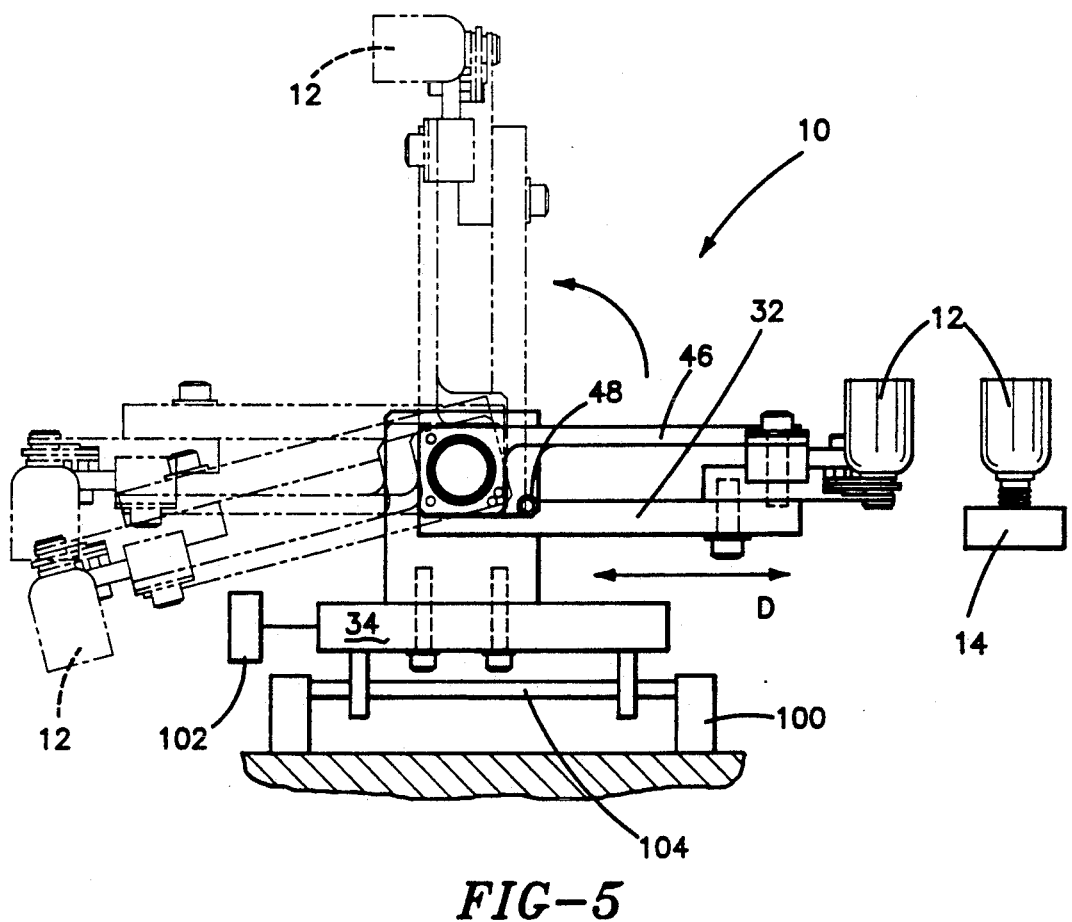
FIG. 5 is a side view of a stripping station, according to the invention, illustrating the various stages of stripping of articles from a pallet.

FIG. 5 further illustrates the pivot of arm 32 which strips articles 12 from pallet 14 and transfers them to a discharge station or outlet (not shown) from where finished articles are gathered. FIG. 5 shows a receiving or admitting position of arm 32, wherein articles 12 are admitted, in solid lines, and also shows several positions through the pivot of arm 32 in phantom. As shown, articles 12 are typically delivered by pallets 14 in a neck down position. After articles 12 are grasped and held by beam 20 and bar 24 in the trapping position, arm 32 is pivoted as shown to strip articles 12 from pallet 14. Once arm 32 has pivoted fully away from pallet 14 and articles 12 are to be discharged, cutout bar 24 is displaced to the ejecting position as shown in FIG. 4C to eject articles 12. As shown in FIG. 5, arm 32 can preferably be pivoted or dipped below the horizontal, in the discharge position, so as to facilitate discharge of articles 12. An added advantage of the present invention resides in that the pivoting of arm 32 also serves to re-orient articles 12 in a neck up or upright position. Once articles 12 have been discharged, arm 32 is pivoted back to a receiving position, and bar 24 is laterally displaced to the admitting position of FIG. 4A, so as to receive a new batch of articles 12.

FIG. 5 also illustrates a preferred embodiment of the invention wherein housing 34 of stripping station 10 is slidably mounted to a base 100. Slidable mounting of housing 34 allows stripping station 10 to be displaced toward and away from a pallet 14 to be stripped, as shown in FIG. 5 by arrow D. This displacement may preferably be accomplished by any suitable motive means 102. Such slidable mounting may be implemented, for example, by slidable mounting of housing 34 to guides 104 fixed to base 100. When stripping station 10 is slidably mounted as described, grasping of articles to be stripped is facilitated by displacing stripping station 10 toward pallet 14 to grasp articles 12, and displacing stripping station 10 away from pallet 14 after articles are stripped.

Figure 6:
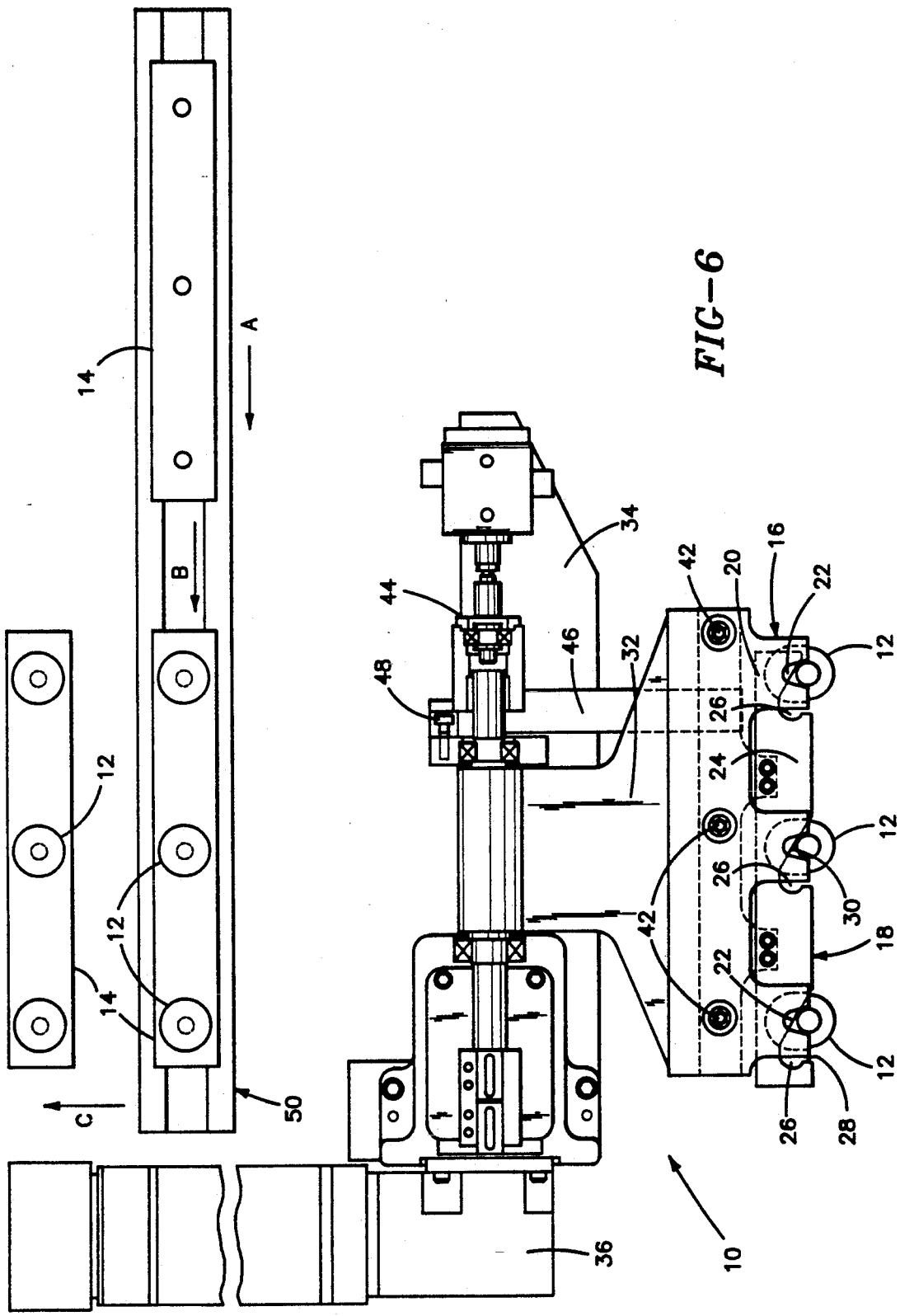
FIG. 6 is a top view of the stripping station of FIG. 1 in a position for discharging stripped articles, according to the invention.

FIG. 6 shows a top view of stripping station 10, with arm 32 pivoted into the discharge position. As shown, stop means 48 is no longer aligned with rod 46, thus allowing bar 24 to be displaced to the ejecting position of FIG. 4C. Also as shown, stripped or empty pallets 14 are recycled to receive a new batch of workpieces 12. Any structure may be used to convey pallets 14 back to a downstream station of the pressure molding machine. For example, a track 50, as shown in FIG. 6, may be used to convey pallets 14 when such pallets 14 are subjected to a lateral force by any means known in the art.

As previously mentioned, and as best shown in FIG. 3, cutouts 26 are preferably symmetrically shaped. This allows the same degree of displacement of bar 24 relative to beam 20 to effect a substantially simultaneous admitting, trapping and ejecting of articles 12 to be stripped.

Referring now to FIGS. 1-6 generally, the operation of stripping station 10, according to the invention, will be described.

Operation is started with arm 32 in the receiving position and bar 24 positioned, relative to beam 20, in the article admitting position as shown in FIG. 1. Articles 12 are moved or admitted into nests 22 of beam 20 by motion of pallet 14. Air cylinder 44 is then actuated so as to displace bar 24 into the trapping position of FIG. 4B. In this position, trapping ridge 28 grasps article 12 and holds it firmly in nest 22. Motive means 36 is then actuated so as to pivot arm 32, with trapped article 12, up and away from pallet 14. Articles 12 are thus stripped from pallet 14. In a conventional manner, stripped pallet 14 is now thrust back into the cycle to receive a fresh batch of workpieces for treatment, and the next loaded pallet 14 approaches stripping station 10.

When arm 32 reaches the discharge position, preferably a position dipping below the horizontal as shown in phantom in FIG. 5, bar 24 is again displaced, by reversal of air cylinder 44, to withdraw trapping ridge 28 and bring ejecting cam 30 into nest 22 so as to push article 12 out of nest 22. This pushing is aided by gravity due to the below horizontal position of arm 32. Articles 12 are discharged without sticking, and arm 32 is pivoted back to the receiving position of FIG. 1 to receive a new batch of finished workpieces.

It should be noted that while the disclosure of the preferred embodiment of this invention is made in terms of a stripping station for finished articles, the teachings of the present invention could, of course, be used in any intermediate station of a pressure molding operation in any situation wherein it is desirable to strip parisons or workpieces from pallets on which they are carried.

Thus disclosed is a stripping station for a hollow plastic article wherein articles are stripped from holding means without suction and without sticking, in a reliable, efficient and simple manner.

This invention may be embodied in other forms or carried out in other ways without departing from the spirit or essential characteristics thereof. The presently described embodiments are therefore to be considered as in all respects illustrative and not restrictive, the scope of the invention being indicated by the appended claims, and all changes which come within the meaning and range of equivalency are intended to be embraced therein.

What is claimed is:

1. A stripping station for stripping hollow plastic articles from a holding means, comprising:
    nest means for receiving neck portions of said articles;
    means for admitting, trapping and ejecting said articles in said nest means, said means for admitting, trapping and ejecting including at least one cutout and being slidably mounted relative to said nest means and being displaceable between an admitting position, wherein said articles can be admitted into said nest means, a trapping position including a trapping means on said cutout of said means for admitting, trapping and ejecting and arranged so that in said trapping position said articles are trapped in said nest means for transport, and an ejecting position including an ejecting cam on said cutout of said means for admitting, trapping and ejecting, said ejecting cam pushing said articles out of said nest of said nest means.

2. A stripping station according to claim 1, wherein said nest means comprises a beam having a plurality of nests, sized to receive neck portions of said articles, said nests being at least equal in number to a number of articles to be removed from a pallet, and being spaced so as to correspond to spacing of said articles on said pallet.

3. A stripping station according to claim 1, further comprising means for recycling stripped holding means to receive a new batch of articles.

4. A stripping station according to claim 1, wherein said hollow plastic articles are hollow blow molded articles.

5. A stripping station according to claim 1 wherein said means for admitting, trapping and ejecting is transversely slidably mounted relative to said nest means.

6. A stripping station for stripping hollow plastic articles from a holding means, comprising:

nest means for receiving neck portions of said articles;

means for admitting, trapping and ejecting said articles in said nest means, said means for admitting, trapping and ejecting being slidably mounted relative to said nest means and being displaceable between an admitting position, wherein said articles can be admitted into said nest means, a trapping position wherein said articles are trapped in said nest means for transport, and an ejecting position wherein said articles are ejected from said nest means;

wherein said nest means comprises a beam having a plurality of nests, sized to receive neck portions of said articles, said nests being at least equal in number to a number of articles to be removed from a pallet, and being spaced so as to correspond to spacing of said articles on said pallet; and wherein said admitting, trapping and ejecting means comprises a bar slidably mounted relative to said beam, said bar having a plurality of cutouts corresponding to said nests in said nest means, said cutouts of said bar each having a trapping ridge and an ejecting cam, arranged so that, when said bar is in said trapping position, said trapping ridge engages with a corresponding article, and when said bar is in said ejecting position, said ejecting cam pushes a corresponding article out of said nest of said nest means.

7. A stripping station according to claim 6, wherein said beam and said bar are mounted on an arm pivotally attached to a frame, said arm being pivotable between a receiving position, wherein said nests face a pallet containing articles to be stripped, and a discharge position, wherein said articles are discharged into a discharge station.

8. A stripping station according to claim 7, further comprising a stop mounted to said frame and interacting with said bar when said arm is in said receiving position so that said bar is displaceable between said admitting position and said trapping position.

9. A stripping station according to claim 8, further comprising means for removing said stop from interaction with said bar when said arm is pivoted to said discharge position, so that said bar is displaceable between said ejecting position and said trapping position.

10. A stripping station according to claim 9, further comprising means for displacing said bar between said admitting, trapping and ejecting positions by an air cylinder.

11. A stripping station according to claim 10, wherein said air cylinder is positioned concentric with an axis of rotation of said arm, said cylinder being connected to said bar through a rod.

12. A stripping station according to claim 7, wherein said arm, when pivoted to said discharge position, is pivoted to an orientation below horizontal so as to facilitate discharge of said articles.

13. A stripping station according to claim 7, wherein said frame is slidably mounted to a base whereby said stripping station can be displaced toward and away from a pallet to be stripped.

14. A stripping station according to claim 6, wherein said bar is attached to a plate slidably disposed on said beam through fasteners mounted in said beam and passing through grooves in said bar, said grooves defining said trapping position and said ejecting position of said bar.

* * * * *